US012525709B2

(12) United States Patent
Caruso et al.

(10) Patent No.: US 12,525,709 B2
(45) Date of Patent: Jan. 13, 2026

(54) ELECTROMAGNETIC INTERFERENCE PROTECTION FOR RADOMES

(71) Applicant: MOTHERSON INNOVATIONS COMPANY LIMITED, London (GB)

(72) Inventors: Dean Caruso, Lonsdale (AU); Scott Agung Edwards, Lonsdale (AU); Simon Belcher, Lonsdale (AU); Garry Gordon Leslie Fimeri, Lonsdale (AU); Bastian Stoehr, Lonsdale (AU); Simon David Field, Lonsdale (AU); Colin Hall, Lonsdale (AU); Tim Symonds, Lonsdale (AU)

(73) Assignee: Motherson Innovations Company Limited, London (GB)

( * ) Notice: Subject to any disclaimer, the term of this patent is extended or adjusted under 35 U.S.C. 154(b) by 235 days.

(21) Appl. No.: 18/448,209

(22) Filed: Aug. 11, 2023

(65) Prior Publication Data

US 2023/0387582 A1 Nov. 30, 2023

Related U.S. Application Data

(63) Continuation of application No. 17/369,364, filed on Jul. 7, 2021, now Pat. No. 11,764,467, which is a (Continued)

(51) Int. Cl.
*H01Q 1/40* (2006.01)
*H01Q 1/42* (2006.01)

(52) U.S. Cl.
CPC .................................... *H01Q 1/42* (2013.01)

(58) Field of Classification Search
CPC ........................................................ H01Q 1/42
(Continued)

(56) References Cited

U.S. PATENT DOCUMENTS

2003/0052810 A1 3/2003 Artis et al.
2003/0080909 A1* 5/2003 Voeltzel ............. H01Q 15/0013 343/713
(Continued)

FOREIGN PATENT DOCUMENTS

DE 10028801 A1 12/2001
DE 10 2015 217744 A1 3/2017
JP 2010 111010 A 5/2010

OTHER PUBLICATIONS

International Search Report dated Apr. 20, 2020 of International Application No. PCT/EP2020/050580 (4 pages).
(Continued)

*Primary Examiner* — Peguy Jean Pierre
(74) *Attorney, Agent, or Firm* — Jones Day

(57) ABSTRACT

The present disclosure relates to a cover for at least one antenna emitting or sensing electromagnetic radiation in at least one first frequency band, the cover includes at least one first surface facing the antenna and at least one second surface averted to the antenna, where the cover includes at least one substrate being transmissible for electromagnetic radiation and at least one first coating covering the substrate in at least one first area, the first coating being transmissible for electromagnetic radiation of at least the first frequency band, whereas the first coating is reflective for electromagnetic radiation falling onto the second surface and having a frequency within at least one second frequency band.

39 Claims, 5 Drawing Sheets

Related U.S. Application Data continuation-in-part of application No. PCT/EP2020/050580, filed on Jan. 10, 2020.

(58) Field of Classification Search
USPC .......................................................... 343/872
See application file for complete search history.

(56) References Cited

U.S. PATENT DOCUMENTS

| | | | | |
|---|---|---|---|---|
| 2012/0119961 | A1 | 5/2012 | Mayer Pujadas | |
| 2013/0194687 | A1 | 8/2013 | Hall et al. | |
| 2014/0225489 | A1 | 8/2014 | Weber et al. | |
| 2016/0011776 | A1 | 1/2016 | Song | |
| 2016/0344095 | A1 * | 11/2016 | Tagi | H01Q 1/3233 |
| 2018/0159207 | A1 | 6/2018 | Shurish et al. | |

OTHER PUBLICATIONS

Written Opinion dated Apr. 20, 2020 of International Application No. PCT/EP2020/050580 (8 pages).
Office Action dated Dec. 14, 2019 of German Application No. DE 10 2019 100 669.4 (in German only) (6 pages).

* cited by examiner

ELECTROMAGNETIC INTERFERENCE PROTECTION FOR RADOMES

CROSS-REFERENCE TO RELATED APPLICATIONS

This application is a continuation of U.S. application Ser. No. 17/369,364, filed on Jul. 7, 2021, which is a continuation-in-part of International Patent Application No. PCT/EP2020/050580, filed Jan. 10, 2020, which claims the benefit of priority to International Patent Application No. PCT/EP2019/077800, filed Oct. 14, 2019, and German Patent Application No. 10 2019 100 669.4, filed Jan. 11, 2019, each of which is hereby incorporated by reference in its entirety for all purposes.

BACKGROUND

1. Field of the Invention

The present disclosure is directed to a cover for at least one antenna emitting and/or sensing electromagnetic radiation in at least one first frequency band, the cover comprising at least one first surface facing the antenna and at least one second surface averted to the antenna, where the cover includes at least one substrate being transmissible for electromagnetic radiation and at least one first coating covering the substrate in at least one first area, the first coating being transmissible for electromagnetic radiation of at least the first frequency band.

2. Related Art

Such covers, which are referred to as radomes in case the antenna is used to emit or receive radar waves, are generally known from the state of the art. For example U.S. Pat. No. 6,518,936 B1 discloses a precision edged radome. It is proposed that the radome includes a patterned copper film functioning as a frequency selective surface.

Such radomes are furthermore more and more used in the automotive industry. With the increasing numbers of driver-assistance-systems, there is a growth of electromagnetic wave emitting and/or receiving devices in vehicles driven by increased safety and vehicle autonomy requirements. Very often used sensors are radar systems using frequencies of 24 GHz or 77 GHz that are located at the front of the vehicle. These systems are used for control of various drive-assistance-systems such as autonomous cruise control.

To not negatively influence the outer appearance of the vehicle, it is preferred that the antenna of such systems is located behind components of the vehicle in the front area of the car. Especially it is preferred to locate theses antennas in the area of the emblem of the vehicle, showing the name of the manufacturer or its trademark.

With this location, the outer appearance of the antenna is increased on one hand and on the other a good protection of the antenna is possible. Thus, a radome used on a vehicle has to fulfill the before described technical needs but on the other hand has to provide an aesthetic appearance. The later makes it necessary that the cover requires metallic finishes or metallic graphics to show the respective emblem. This however creates problems because the metal finishes that are required for the outer appearance and visual effects, attenuate a radar and prevent its proper function.

Especially unobstructed transmission of discrete electromagnetic wavelength signal bandwidths is critical for devices outfitted with the before described driver assistance systems in order for them to gather information from the surrounding environment. Usually in such systems, radar units are typically 2 in 1 devices with both transmitter and receiver in the same element. Such systems can be located in the bumper area of the car but in most cases in which the radar units are used to control the emergency break assistent (EBA) and adaptive cruise control (ACC) it is preferred that the system sits behind the manufacturer emblem which hence acts as radome.

In the past it was proposed to use materials like indium, tin or mettaloids which can be deposited using physical vapor deposition such that the radar is less influenced. However, these materials and methods do not provide the wanted outer appearance and a negative influence on the radar antenna cannot be avoided.

SUMMARY

In an aspect, a cover is provided that on one hand does not negatively influence the functionality of the antenna and on the other hand provides an aesthetic outer appearance.

The first coating may be reflective for electromagnetic radiation falling onto the second surface and having a frequency within at least one second frequency band.

It is especially preferred that the antenna is a radar antenna and/or the first frequency band is radar frequency, especially 10 GHz to 130 GHz, preferably 20 GHz to 100 GHz, more preferred 20 GHz to 30 GHz, 70 GHz to 80 GHz and/or 90 GHz to 100 GHz, most preferably 24 GHz, 77 GHz or 93 GHz.

For the before mentioned embodiments the invention proposes that the substrate is transmissible for electromagnetic radiation in the first frequency band and/or in at least one third frequency band, wherein preferably the second frequency band is at least partly identical to the third frequency band.

It is also preferred that the first coating is located between the substrate and the antenna and/or located on the side of the first surface of the substrate.

Furthermore it is proposed that the first coating is located on the side of the second surface of the substrate.

In the before described embodiment it is preferred that at least one stress controlling layer is located between the substrate and the first coating.

An inventive cover can be characterized by at least one second coating, preferably at least partly located between the substrate and/or the first coating on the one hand and the antenna on the other hand, wherein the second coating is at least partly non transmissible and/or opaque in at least one fourth frequency band, preferably the second frequency band and/or the third frequency band, and/or transmissible in the first frequency band.

Also a cover can be characterized by at least one masking layer at least partly covering the first coating and/or the substrate, wherein the making layer is at least partly non transmissible and/or opaque in at least one fifth frequency band, preferably the second frequency band, the third frequency band and/or the fourth frequency band, and/or transmissible in the first frequency band.

Advantageous embodiments of the cover can be characterized in that, the second frequency band, the third frequency band and/or the fourth frequency band, comprises 384 THz to 789 THz and/or visual light.

In the before described embodiment it is especially preferred that the second frequency band, the fourth frequency band and/or the fifth frequency band covers the area of 384

THz to 789 THz and/or the third frequency band covers only partly the area of 384 THz to 789 THz.

The invention furthermore proposes that at least one covering layer is located on a side of the first coating being located averted to the substrate, wherein the covering layer is transparent, at least semitransparent for the second, third, fourth and/or fifth frequency band.

Furthermore it is proposed that the substrate comprises at least partly at least one thermoplastic material, preferably polycarbonate, polymethylmethacrylate, polyethylene, polyester, polyvinyl chloride, polypropylene, polystyrene, acrylonitrile butadiene styrene, acrylonitrile ethylene styrene, polyacrylate and/or a mixture thereof.

For the inventive cover it is preferred that the first coating comprises at least one metallic material, preferably chrome, aluminium, silver, zinc, copper, nickel, vandium, titanium, zirconium, niobium, gold, rhodium, cobalt, manganese, molybdenum, tantalum, silver and/or a mixture thereof.

Further advantageous embodiments can be characterized in that the first coating acts as a frequency selective surface bandpass filter and/or comprises at least one repetitive pattern, wherein the pattern preferably comprises, especially a plurality of elements being formed as, crosses, circles, squares, stars, rectangles, lines, hexagons, ellipsoids, polygons, annulus, semicircles, circular sectors, *triquetra*, lune, arbelos, spiral, lemniscates, triangles and/or oval forms.

In the before described embodiment it is preferred that the elements are formed by, especially from each other separated, openings and/or gaps within the first coating.

Also it is proposed that the elements are formed by, especially from each other separated and/or not interconnected, areas of the first coating.

It is also proposed that the second coating and/or the mask layer comprises at least one thermoplastic, preferably Polycarbonate (PC), Acrylonitrile butadiene styrene (ABS), Acrylnitril-Ethylen-Styrol (AES) and/or Polycarbonate acrylonitrile butadiene styrene (PCABS).

The invention can be further characterized in that the first coating, when viewed onto the second surface of the cover presents at least one logo, character, number, graphical trademark, trademark, decorative design and/or decorative pattern.

Alternatively it can be planned that the masking layer covers the first coating such that when viewed onto the second surface, only at least a first area of the first coating is visible, wherein the first area has the form of at least one logo, character, number, graphical trademark, trademark, decorative design and/or decorative pattern, wherein the first area is contiguous or formed by at least partly separated subareas.

An inventive cover can be characterized by at least one third coating being located on the first surface, especially between the substrate and the first coating, wherein the third coating is especially electrically insulating.

In addition or alternatively the cover can be characterized by at least one fourth coating, preferably located on the second surface and/or the side of the second surface of the substrate, between the substrate and the first coating and/or the covering layer, and/or located on the side of the first coating and/or the covering layer averted to the substrate, wherein the fourth coating especially forms a thermal hardcoat, optionally including light scattering particles.

Furthermore it is preferred that the first coating reflects more than 50%, preferably more than 75%, more preferred more than 85%, much more preferred more than 90%, most preferred more than 95% and/or the first coating has at least one edge being at least partly curved and/or the first coating comprises, especially in the area of the edge, at least one resistive loading.

The invention furthermore provides a method of producing a cover for at least one antenna emitting and/or sensing electromagnetic radiation in at least one first frequency band, especially a cover according to the invention, wherein the method comprises the steps of proving and/or producing at least one substrate;

covering the substrate with at least one first coating, wherein the first coating provides a frequency selective surface band pass filter being transmissible for radiation having a frequency in the first frequency band, wherein furthermore as first coating a material being highly reflective for frequencies in a second frequency band is used.

The invention proposes for the method furthermore that it is characterized by covering the substrate with at least one masking layer being non transmissible for electromagnetic radiation in the second frequency band, preferably the substrate is covered with the masking layer before covering the substrate with the first coating, especially the first coating is located at least partly on the masking layer.

Also it is preferred that the frequency selective surface band pass filter is produced by structuring of the first coating after its deposition onto the substrate, preferably by laser etching.

The method may be characterized in that the structure comprises the forming of a plurality of elements forming a pattern, wherein the elements especially comprise, preferably from each other separated, openings and/or gaps within the first coating and/or comprise, preferably from each other separated, areas of the first coating, especially separated by the gaps and/or openings.

Also the inventive method can be characterized in that the first coating is produced by sputtering, especially PVD magnetron sputtering deposition.

Furthermore it is proposed that the method further comprises providing at least one first fourth, preferably at least one hardcoat forming, coating and/or at least one stress controlling layer being at least partly located between the substrate and the first coating.

Finally it is preferred that the method further comprises providing at least one second fourth, at least one hard coat forming, coating being at least partly located on the side of the first coating averted to the substrate and/or at least one covering layer, especially being transparent, at least semitransparent, for visual light and/or electromagnetic radiation in a frequency band comprising at least partly 384 THz to 789 THz.

Thus the invention is based on the surprising finding that by using a material that is highly reflective for visible light, like aluminium or chrome, the aesthetic outer appearance of the cover can be increased without negatively influencing the functionality of the antenna covered by the cover in which the first coating is simultaneously formed as a frequency selective surface band pass filter, allowing the not negatively influenced transmission of the electromagnetic radiation emitted and received by the antenna.

By providing a pattern metallic coating, it is possible to provide a highly reflective area on the surface of the cover that gives the observer the impression of a closed reflective surface allowing to present the wanted logos or emblems. On the other hand, the pattern is designed such that it functions as a pass filter for electromagnetic radiation in the first frequency band such as 27 or 77 GHz, allowing the antenna to function without any negative influence.

The frequency selective surface can be formed by a pattern using elements that are repeated periodically. The pattern can be formed by forming openings in the generally closed metallic coating, for example by etching. In other words, the openings in metallic areas form the elements and the metallic areas remain at least partly connected to each other.

In alternative embodiments, the pattern is formed by producing gaps between the metallic areas such that a pattern of metallic "islands" is formed, wherein preferably the metallic areas form the elements that are especially not connected to each other. Typically, these elements have a size less than 50 μm to ensure they cannot be easily seen by an observer. Furthermore it is possible to change the pattern from a fully periodic pattern to areas in which corrections to the shaping and sizing as well as occasional ornamental elements are provided to allow geometric effects on a three dimensional surface.

It is preferred that the first coating is deposited on a substrate like a plastic or polycarbonate substrate. The deposition can be carried out by a sputtering process like PVD magnetron sputtering to deposit a conductive aluminium or chrome coating on the substrate. After the deposition of the first coating, the structure is formed within the coating, especially the use of a CNC femtosecond laser allows a laser etching of a pattern into the first coating. This allows to provide the first coating with band pass filter characteristics or properties. To form the structure of the respective logo or emblem, it is possible that the first coating only covers a part of the substrate. With a second coating being located on the first coating on the side that is opposite to the substrate, it can be reached that an inspector cannot see the antenna. For this reason, the second coating is not transmissible for visual light and can be produced by a second molding made of polycarbonate, ABS, AES or PCABS. The second coating can be especially used to encapsulate the back side of the cover and to protect the first coating from outer influences.

In an alternative embodiment, the first coating can present a closed surface over a wide area, independent from the finally wanted logo or emblem. Especially, the first coating can cover the complete substrate. To then produce the outer appearance of the logo and emblem before depositing the first coating on the substrate, a masking layer can be deposited on the substrate. With the masking layer, the areas which should not be reflective in the final cover, are marked out so that only the remaining parts of the first coating can produce a reflective outer appearance.

This second embodiment has the advantage that any boundary conditions at the edges of the first coating are not existing. However, such effects can be reduced in the first embodiment by forming the first coating such that edge diffraction is reduced. Any radiating surface waves produced at the boundaries of the first coating can be reduced by forming the outer edge at least curved or by adding small resistive loadings to the single elements of the structure of the first coating. Furthermore, the surface area of the boundary region is a very small percentage of the overall view of field of the antenna. Thus, the effects imposed by the boundary conditions of the finite surface are surprisingly nearly neglectable so that the performance of the antenna is not significantly negatively influenced.

An example of the structure used in the first coating might be an unidirectional line having a width of 500 μm with 10 μm gaps in between. Alternatively, lines of 328 μm width with gaps of 6.5 μm can be used. Also it is possible to use 200 μm wide lines with 5 μm gaps in between or bidirectional lines, i.e. a grit pattern, with 500 μm metal segments with 10 μm gaps in between.

To further increase the efficiency of the cover, an insulated coating might be deposited between the first coating, the masking layer and/or the second coating. On the side of the substrate, being located opposite of the first coating, a fourth coating in form of a thermal hardcoat can be provided to protect the cover with respect to outer influences.

BRIEF DESCRIPTION OF THE DRAWINGS

Further advantages of the invention are explained in the following description of preferred embodiments with the help of the following figures.

DETAILED DESCRIPTION

Figure 1:
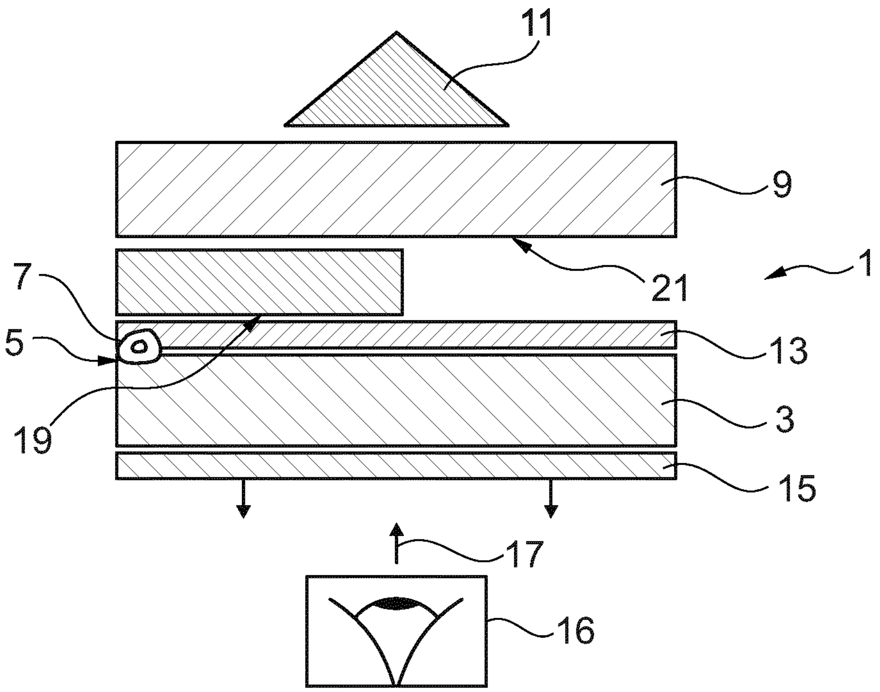
FIG. 1 shows a schematic cross-sectional view of an inventive cover according to the first embodiments.

FIG. 1 shows a schematic cross-sectional view on a cover 1 according to the invention.

Cover 1 comprises substrate 3, for example comprising molded clear polycarbonate.

On the side of a first surface 5 of the substrate 3, a first coating 7 in form of a reflective patterned metallic coating, is provided. On the side of the first coating 7, being opposite to the substrate 3, a second coating 9, preferably comprising a molded dark polycarbonate material is provided. By the cover 1, an antenna in form of a radar unit 11 is covered. In the first embodiment between the first coating 7 and the substrate 3, a third coating 13 in form of an insulating coating is provided. Finally, on the side of the substrate 3 being opposite to the first coating 7 and the third coating 13, a fourth coating in form of a thermal hardcoat 15 is provided.

Cover 1 may be produced by first providing the substrate 3, then depositing the third coating 13 onto the substrate 3 before depositing the first coating 7, for example by PVD magnetron sputtering. The first coating 7 includes a highly reflective metal material like chrome or aluminium. Before the second coating 9 is deposited on the first coating 7, the first coating 7 is structured, for example by a CNC femtosecond laser. The laser allows to laser etch a pattern into the first coating 7 that provides a frequency selective surface band pass filter. The structure is described in more detail with the help of FIGS. 3*a* to 3*e* later.

This allows the first coating 7 to be transmissible for electromagnetic radiation in a first frequency band, especially that is emitted by the radar unit 11. However, the first coating 7 is highly reflective for electromagnetic radiation in a second frequency band, especially for visual electromagnetic radiation falling onto the first coating.

With the substrate 3 being transmissible for radiation in the first frequency band as well as radiation in the second frequency band, especially visual light, as well as electromagnetic radiation produced by the radar unit 11, the cover 1 does not negatively influence the functionality of the radar unit 11 but allows to provide an aesthetic visual outer appearance of cover 1.

To reach this aim, the second coating 9 is transmissible for the radiation of the first frequency band, so that radiation of the radar unit 11 can pass but is not transmissible for radiation of a third frequency band, that is preferably identical to the second frequency band, so that radiation in the visual wave lengths is blocked. Thus, a person 16 looking at the cover from a direction 17, sees an area 19 that is highly reflective and a more or less black area 21, screening the radar unit 11 from any visual light, so that a user 16 cannot see the radar unit 11 but only sees the structure or logo provided by the first coating 7. Especially the area 21 appears to be black, whereas the area 19 has a lustrous appearance.

Figure 2:
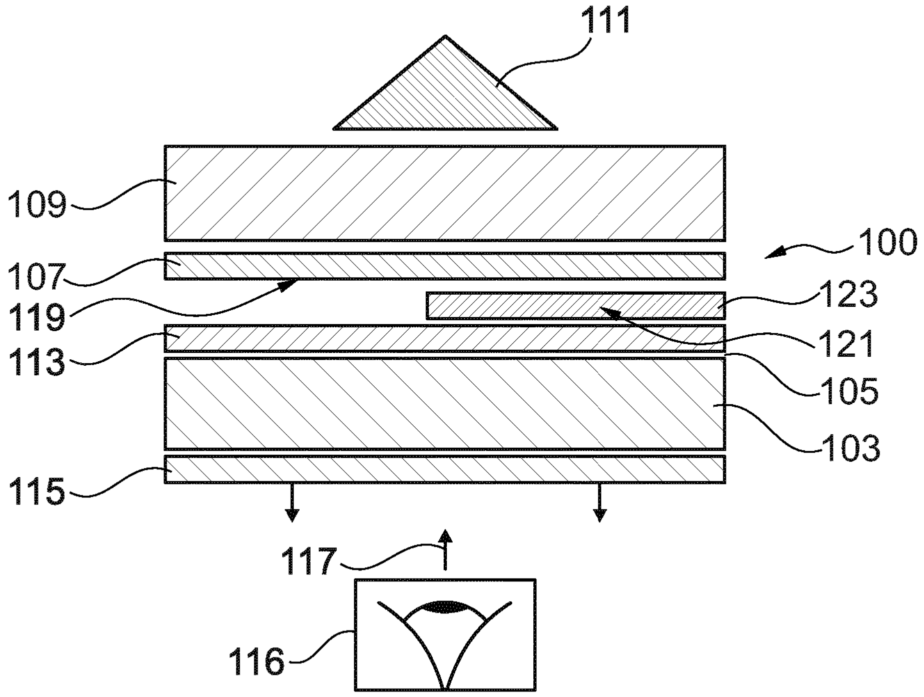
FIG. 2 shows a schematic cross-sectional view of a second embodiment of an inventive cover.

In FIG. 2, a second embodiment of a claimed cover 100 is shown. The elements of cover 100, having the same functionalities as the respective elements in cover 1, have the same reference signs, however increased by 100. In comparison to cover 1, in cover 101, the first coating 107 is not restricted to a respective area but nearly covers the complete substrate 103.

To generate the outer appearance of the wanted logo or emblem, additionally masking layer 123 is used. A masking layer 123 is provided between the substrate 103 and the first coating 107. The masking layer 123 is, similar to the second coatings 9 or 109, non transmissible for a radiation in a fifth frequency band, especially the second frequency band, but transmissible for radiation in the first frequency band. Thus the masking layer 123 provides a black area for a user 16 looking at cover 101 from the direction 117.

Thus, similar to the cover 1, the area 119 provides a lustrous appearance whereas the area 121 provides an appearance as black for a user 116. Again, the masking layer 123 is chosen such that it is transmissible for the electromagnetic radiation provided by the radar unit 111, whereas it is non-transmissible for any electromagnetic radiation in the visual spectrum.

As all light falling onto the substrate 103 is either reflected or blocked by coating 107 and masking layer 123, respectively, other second coatings 109 may be used. The second coating 109 might be completely omitted or might provide a protection for the coating 107 without the necessity of being non transmissible for radiation in the visual range as long as being transmissible for radiation in the first frequency band used by radar unit 11.

As described before, the first coating 7, 107 provide a frequency selective surface band pass filter. Such a filter is a thin, repetitive surface designed to reflect, transmit or absorb electromagnetic fields based on the different frequencies of the fields. In the inventive cover 1, 101 the frequency selective surface is trimmed such that electromagnetic radiation of the first frequency band (used by unit 11, 111) is transmitted, whereas radiation in the second frequency band, especially visual light, is reflected. This aim is reached by providing a highly reflective coating being made of a highly reflective material like chrome or aluminium. Into this coating, a structure or pattern is formed, especially etched, to provide the transmissibility for the first frequency band.

Such a pattern consists of elements having dimensions in the size smaller than 50 μm to not be seen too easily. Preferably elements having dimensions being greater than 50 μm and having distances of a few μm.

The elements might have the form of crosses 201*a*, 201*b*, either completely filled like element 201*b* or having a center being left open like elements 201*a*. Also star form elements 203*a*, 203*b* or 203*c* might be used. Again these elements 203*a*, 203*b*, 203*c*, 203*d* might have left open centers like elements 203*a*, 203*d* or might be solid like elements 203*b*, 203*c*. Further examples of elements being formed iteratively in the pattern might comprise solid or left open circle form elements 205*a*, 205*b*, rectangular or quadratic form elements 207*a*, 207*b* and or hexagonally formed elements 209*a*, 209*b* as well as line elements 211.

Figure 3A:
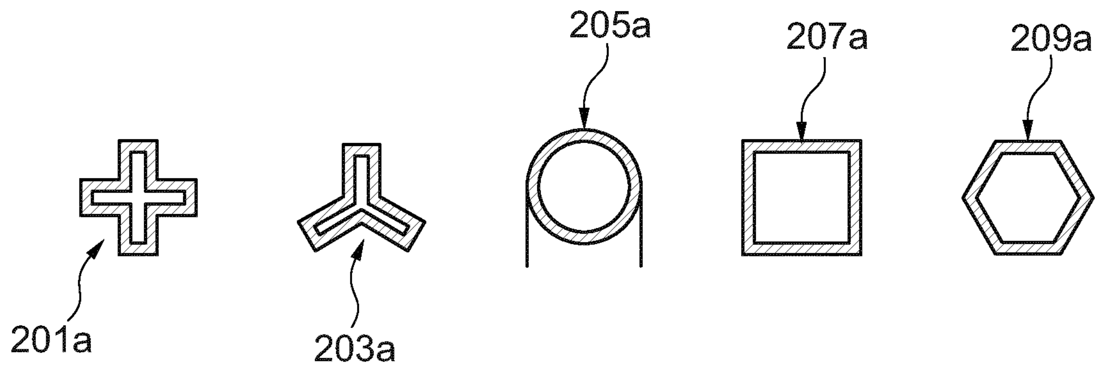
FIG. 3*a* shows a first set of exemplary elements of the pattern to provide a frequency selective surface band pass filter.
Figure 3B:
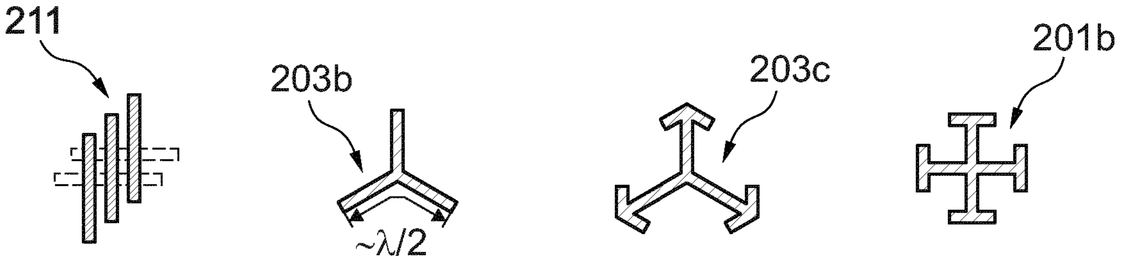
FIG. 3*b* shows a further second set of exemplary elements of the pattern.
Figure 3C:
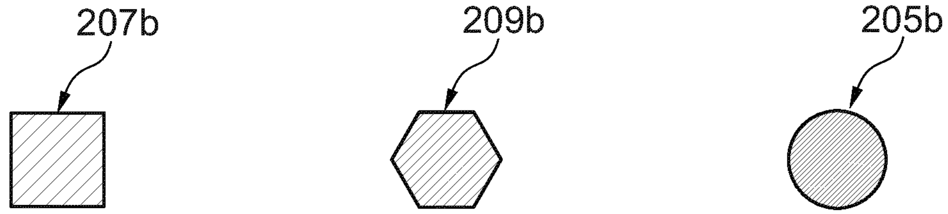
FIG. 3*c* shows a further third set of exemplary elements of the pattern.
Figure 3D:
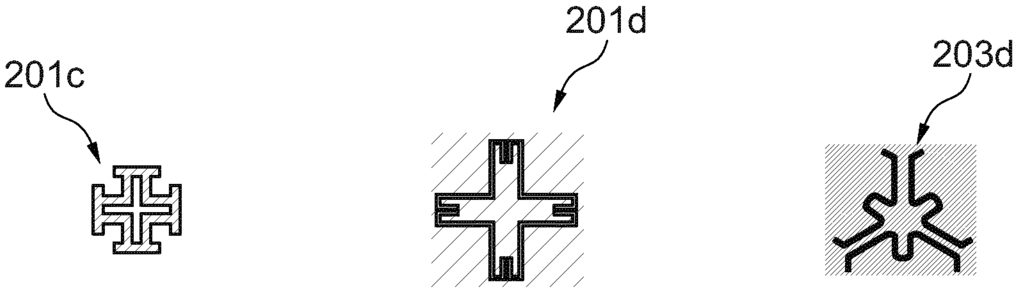
FIG. 3*d* shows a fourth set of exemplary elements of the pattern.
Figure 3E:
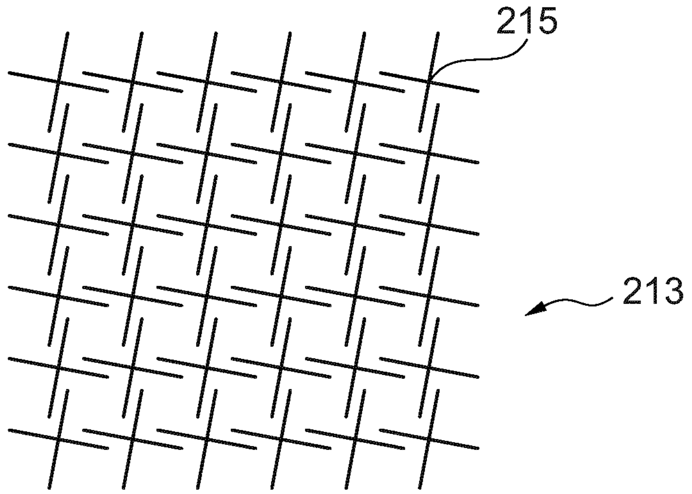
FIG. 3*e* shows an exemplary first pattern to provide a frequency selective surface band pass filter.

In FIG. 3*a*, a schematic detail of a pattern 213 formed in coatings 7, 107 to provide a band pass filter, is shown. The pattern 213 comprises a repetitive structure in which the elements 215, here cross elements, are formed in a repetitive form.

Figure 4:
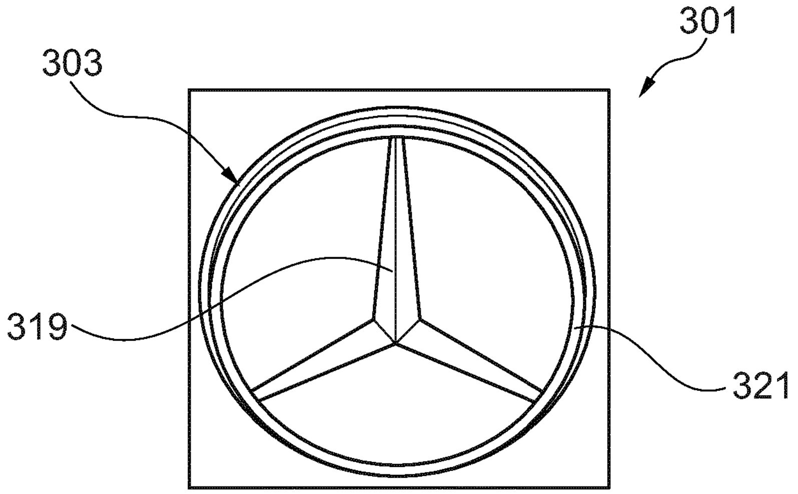
FIG. 4 shows a view on a cover according to the invention.

In FIG. 4, a perspective view onto a cover 301 of the invention is shown. As can be seen in FIG. 3, the area 321 appears to be black whereas areas 319 allow a view onto the first coating 307, providing a lustrous appearance. In this way the visual appearance is increased as the star logo is provided and simultaneously the in FIG. 4 not shown radar unit is covered and not visible for the viewer.

Figure 5:
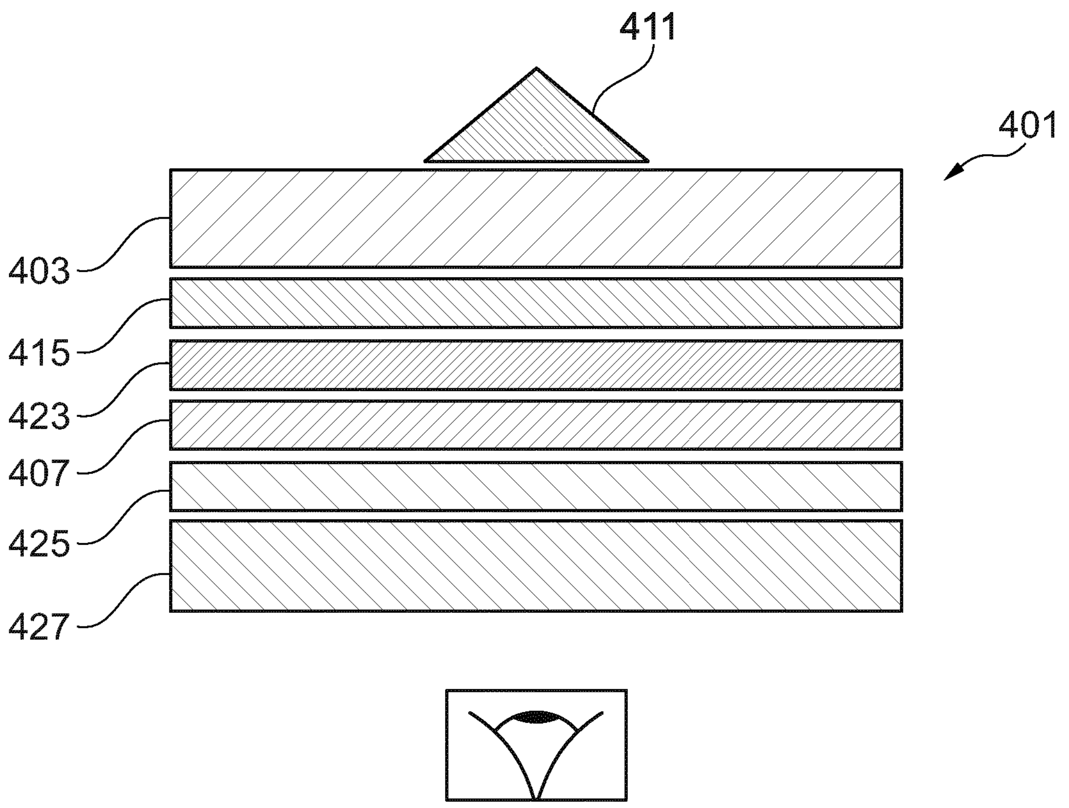
FIG. 5 shows a schematic cross-sectional view of a third embodiment of an inventive cover.

In FIG. 5, a schematic cross-sectional view onto a third embodiment of an inventive cover 401 is shown. In contrast to the embodiments shown in FIGS. 1 and 2 as described before, a substrate 403 in form of a moulded part made for example of a dark, i.e. for visual light opaque ABS, AES, PCABS, or polycarbonate is located on the side of the cover 401 facing the radar unit 411.

This means in turn that the first coating 407 is located on the side of the substrate 403 being averted to the radar unit 411.

Between the substrate 403 and the first coating 407, an optional first fourth coating in form of a hardcoat 415 is located. Furthermore, a stress controlling layer 423 may be also located between the substrate 403 and the first coating 407. By the stress controlling layer 423 respective different mechanical characteristics of the substrate 403 and the first coating 407 and/or the hardcoat 415 are compensated. For example, the substrate 403 and/or the hardcoat 415 might have different thermal expansions. By the layer 423, these are compensated such that the forming of cracks or a separation of the first coating 407 from the substrate and/or the hardcoat 415 is avoided.

The first coating 407 is covered by a covering layer 425 being transparent or semi-transparent for electromagnetic radiation in the visual range. The covering layer 427 might be covered by a second fourth coating in form of a hardcoat 427, optionally including light scattering particles. With the light scattering particles, the overall visual impression of the cover 401 is increased as the three-dimensional impression for a viewer is increased and the emblem formed by the pattern within the first coating 407 is visible over a broader angle of view.

Figure 6A:
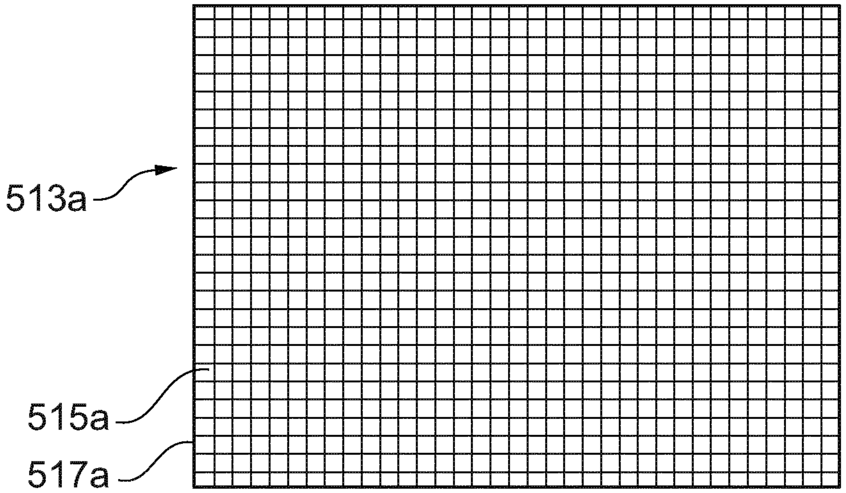
FIG. 6*a* shows an exemplary second pattern to provide a frequency selective surface bandpass filter.
Figure 6B:
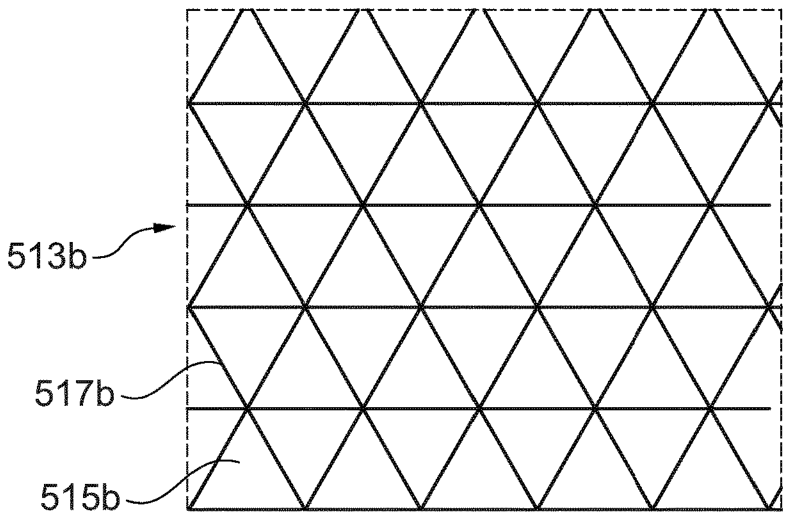
FIG. 6*b* shows an exemplary third pattern to provide a frequency selective surface bandpass filter.
Figure 6C:
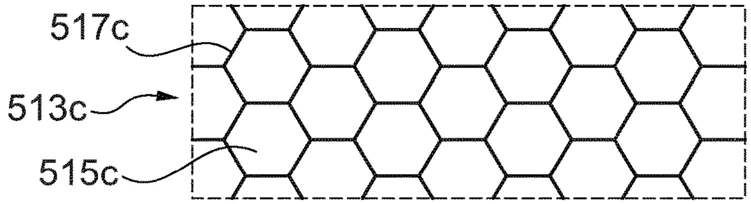
FIG. 6*c* shows an exemplary fourth pattern to provide a frequency selective surface bandpass filter.

In FIGS. 6*a* to 6*c*, alternative patterns 513*a*, 513*b*, 513*c*, formed in the first coating 7, 107 or 407 as described above are shown. The pattern 513*a* shown in FIG. 6*a* is formed by a plurality of elements 515*a*, forming metallic "islands" that are separated from each other by openings or gaps 517*a*.

The patterns 513*a*, 513*b* and 513*c* differ from each other that in FIG. 6*a*, the elements 515*a* have a square form whereas the elements 515*b* of the pattern 513*b* have the form of triangles whereas the elements 515*c* of pattern 513*c* have the form of pentagons. The openings 517*b*, 515*c*, that have been formed in the metallic coating by laser etching, have respective different forms compared to the openings 517*a*. It has been found by the inventors that the effectiveness of the frequency bandpass filter formed by the patterns 513*a*, 513*b* and 513*c* is increased, due to the separation of the metallic elements 515*a*, 515*b* and 515*c*, shown in white colours in FIGS. 6*a* to 6*c*. The respective gaps separating the elements 515*a*, 515*b* and 515*c* from each other are shown in black colours in FIGS. 6*a* to 6*c*.

Figure 7:
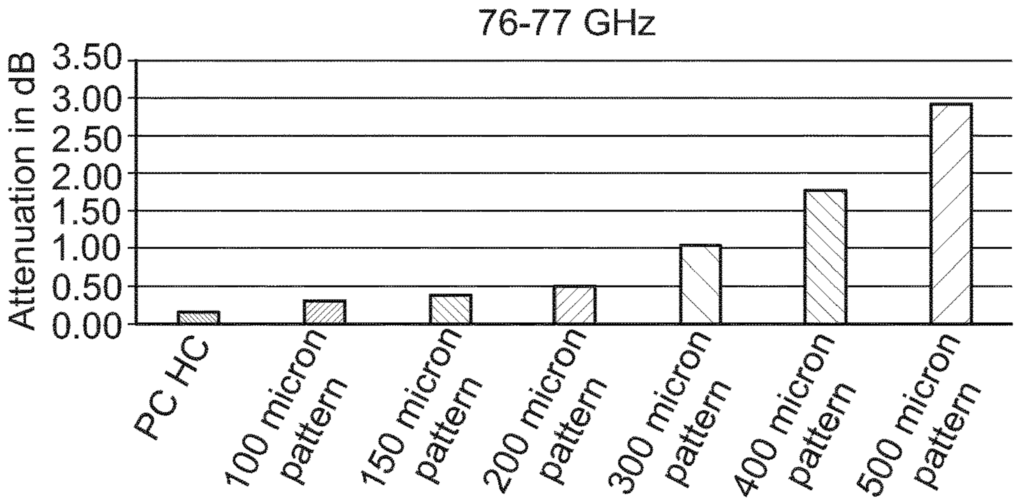
FIG. 7 shows a diagram showing the correlation between the size of elements within a pattern and the attenuation for electromagnetic correlation of 76 to 77 GHz.

As shown in FIG. 7, the inventors have compared the respective dimensions of the elements with respect to the attenuation for electromagnetic radiation in the frequency area of 76 to 77 GHz. The result is shown in FIG. 7. As can be taken from FIG. 7, the size of the elements 515*a*, 515*b* and 515*c* should be <400 μm, even better <100 μm. Test data suggest that an attenuation is depending on the size of the longest line segment and/or the longest geometrical dimension of the respective element. This seems to be especially the case for irregularly formed elements. The inventors assume that by these dimensions, the electrical disconnection of the metallic film elements is more efficient.

The attenuation seems to depend, especially for regularly formed elements, secondarily on the area covered by the respective elements. Based on the before described sizes the elements should have an area of less than 1600 μm 2, even better less than 1000 μm 2.

Furthermore, it has been found that the openings 517*a*, 517*b* and 517*c* should have dimensions, especially with less than 8 μm, even better less than 5 μm. In this way the openings 517*a*, 517*b* and 517*c*, preferably formed by ablation, cannot be easily seen by a user and thus the overall visual impression is not negatively influenced.

As shown in FIG. 7, the attenuation for the size of the elements of 500 μm, having an attenuation of about 3 db, can be reduced to 0.3 db when reducing the size of the elements to less than 100 μm. Thus, when comparing this attenuation to the attenuation of a polycarbonate hardcoat and/or hardcoated polycarbonate, it can be seen that the attenuation comes close to this attenuation without a metal coating.

The patterns 513*a*, 513*b* and 513*c* might be formed by applying an electrically conductive chrome coating, using PVD magnetron sputtering deposition to the hardcoated polycarbonate substrate. The respective openings 517*a*, 517*b* and 517*c* can be formed by placing the coated substrate on a CNC femtosecond laser system. By the laser system, the patterns are laser edged into the coating allowing it to act as a radome.

Examples might be bidirectional lines forming 10 μm gaps with 500 μm metal squares in between, as shown in FIG. 6*a*. Optionally, the gaps might have a width of 8 μm, preferably 6 μm, most preferably 3 μm, whereas the element 515*a* might have a side length of 200 μm, preferably 100 μm, most preferably less than 30 μm. Especially to reach the structure shown in FIG. 5, the coated substrate is then placed in a moulding machine and a rear section of the badge is formed, encapsulating the first coating and completing the radome in form of the cover 401.

The features disclosed in the specification, the claims as well as the figures, can be essential for the claimed invention both taken separately or in combination with its different embodiments.

REFERENCE SIGN LIST

1 cover
3 substrate
5 surface
7 1st coating
9 2nd coating
11 radar unit
13 3rd coating
15 thermal hardcoat
16 person
17 direction
19 area
21 area
101 cover
103 substrate
105 surface
107 1st coating
109 2nd coating
111 radar unit
113 3rd coating
115 thermal hardcoat
116 person
117 direction
119 area
121 area
123 masking layer
201*a*, 201*b*, 201*c*, 201*d* cross element
203*a*, 203*b*, 203*c*, 203*d* star element
205*a*, 205*b* circle element
207*a*, 207*b* rectangle element
209*a*, 209*b* hexagonal element
211 line element
213 pattern
301 cover
303 substrate
308 coating
319 area
321 area
401 cover
403 substrate
407 first coating
411 radar unit
415 hardcoat
423 stress controlling layer
425 covering layer
427 hardcoat
513*a*, 513*b*, 513*c* pattern
515*a*, 515*b*, 515*c* elements
517*a*, 517*b*, 517*c* opening

What is claimed is:

1. A cover for an antenna emitting or sensing electromagnetic radiation in a first frequency band, the cover comprising:

a first surface facing the antenna and a second surface averted to the antenna;

a substrate that is transmissible for electromagnetic radiation of the first frequency band;

a first coating covering the substrate in a first area, the first coating being transmissible for electromagnetic radiation of the first frequency band, wherein the first coating is reflective for electromagnetic radiation falling onto the second surface and having a frequency within a second frequency band; and a stress controlling layer located between the substrate and the first coating.

2. The cover of claim 1, wherein the antenna is a radar antenna and the first frequency band is a radar frequency.

3. The cover of claim 1, wherein the first frequency band is 20 GHz to 100 GHz.

4. The cover of claim 1, wherein the substrate is transmissible for electromagnetic radiation in a third frequency band, wherein the second frequency band is at least partly identical to the third frequency band.

5. The cover of claim 1, wherein the first coating is located between the substrate and the antenna.

6. The cover of claim 1, wherein the first coating is located on a side of the first surface of the substrate.

7. The cover of claim 1, wherein the first coating is located on a side of the second surface of the substrate.

8. The cover of claim 1, further comprising:

a second coating at least partly located between the substrate and/or the first coating on the one hand and the antenna on the other hand, wherein the second coating is at least partly non-transmissible and/or opaque in the second frequency band.

9. The cover of claim 8, wherein the second coating comprises a thermoplastic material.

10. The cover of claim 9, wherein the thermoplastic comprises Polycarbonate (PC), Acrylonitrile butadiene styrene (ABS), Acrylnitril-Ethylen-Styrol (AES), or Polycarbonate acrylonitrile butadiene styrene (PCABS).

11. The cover of claim 1, further comprising:

a masking layer at least partly covering the first coating and/or the substrate, wherein the masking layer is at least partly non-transmissible and/or opaque in the second frequency band.

12. The cover of claim 11, wherein the masking layer comprises a thermoplastic material.

13. The cover of claim 12, wherein the thermoplastic material comprises Polycarbonate (PC), Acrylonitrile butadiene styrene (ABS), Acrylnitril-Ethylen-Styrol (AES), or Polycarbonate acrylonitrile butadiene styrene (PCABS).

14. The cover of claim 11, wherein the masking layer covers the first coating such that when viewed onto the second surface, only a first area of the first coating is visible, wherein the first area has the form of a logo, character, number, graphical trademark, trademark, decorative design, or decorative pattern, and wherein the first area is contiguous or formed by at least partly separated subareas.

15. The cover of claim 1, wherein the second frequency band comprises 384 THz to 789 THz and/or visual light.

16. The cover of claim 1, further comprising:

a covering layer located on a side of the first coating being located averted to the substrate, wherein the covering layer 425) is at least semi-transparent for the second frequency band.

17. The cover of claim 1, wherein the substrate comprises a thermoplastic material.

18. The cover of claim 17, wherein the thermoplastic material comprises polycarbonate, polymethylmethacrylate, polyethylene, polyester, polyvinyl chloride, polypropylene, polystyrene, acrylonitrile butadiene styrene, acrylonitrile ethylene styrene, polyacrylate, or a mixture thereof.

19. The cover of claim 1, wherein the first coating comprises a metallic material.

20. The cover of claim 19, wherein the metallic material comprises chrome, aluminum, zinc, copper, nickel, vandium, titanium, zirconium, niobium, gold, rhodium, cobalt, manganese, molybdenum, tantalum, silver, or a mixture thereof.

21. The cover of claim 1, wherein the first coating acts as a frequency selective surface bandpass filter.

22. The cover of claim 1, wherein the first coating comprises a repetitive pattern that includes a plurality of elements formed as crosses, circles, squares, stars, rectangles, lines, hexagons, ellipsoids, polygons, annulus, semicircles, circular sectors, *triquetra*, lune, arbelos, spiral, lemniscates, triangles, or oval forms.

23. The cover of claim 22, wherein the elements separated from each other by openings and/or gaps within the first coating.

24. The cover of claim 22, wherein the elements separated from each other by areas of the first coating.

25. The cover of claim 1, wherein the first coating, when viewed onto the second surface of the cover presents a logo, character, number, graphical trademark, trademark, decorative design, or decorative pattern.

26. The cover of claim 1, further comprising a third coating located on the first surface between the substrate and the first coating, wherein the third coating is electrically insulating.

27. The cover of claim 1, further comprising: a fourth coating located on the second surface and/or a side of the second surface of the substrate, between the substrate and the first coating and/or the covering layer, or located on a side of the first coating and/or the covering layer averted to the substrate, wherein the fourth coating forms a thermal hardcoat including light scattering particles.

28. The cover of claim 1, wherein the first coating reflects more than 50%.

29. The cover of claim 1, wherein the first coating has at least one edge being at least partly curved.

30. The cover of claim 1, wherein the first coating comprises, in the area of the edge, at least one resistive loading.

31. A method of producing a cover for an antenna emitting and/or sensing electromagnetic radiation a first frequency band, comprising:

providing a substrate;

covering the substrate with a first coating, wherein the first coating provides a frequency selective surface bandpass filter being transmissible for radiation having a frequency in the first frequency band; and providing at least one stress controlling layer being at least partly located between the substrate and the first coating, wherein the first coating comprises a material that is highly reflective for frequencies in a second frequency band.

32. The method of claim 31, further comprising:

covering the substrate with a masking layer that is non-transmissible for electromagnetic radiation in the second frequency band.

33. The method of claim 32, wherein the substrate is covered with the masking layer before covering the substrate with the first coating, and the first coating is located at least partly on the masking layer.

34. The method of claim 31, wherein the frequency selective surface bandpass filter is produced by structuring of the first coating after its deposition onto the substrate.

35. The method of claim 34, wherein the frequency selective surface bandpass filter is produced by laser etching.

36. The method of claim 34, wherein the structure comprises the forming of a plurality of elements forming a pattern, wherein the elements comprise openings and/or gaps within the first coating and/or comprise areas of the first coating separated by the gaps and/or openings.

37. The method of claim 31, wherein the first coating is produced by sputtering.

38. The method of claim 31, further comprising:

providing a first fourth coating.

39. The method of claim 31, further comprising:

providing at least one second fourth coating being at least partly located on a side of the first coating averted to the substrate and/or at least one covering layer, being at least semitransparent for visual light and/or electromagnetic radiation in a frequency band comprising 384 THz to 789 THz.

* * * * *